United States Patent
Li et al.

(10) Patent No.: US 11,685,104 B2
(45) Date of Patent: Jun. 27, 2023

(54) DYNAMIC CORRECTING SYSTEM OF MANUFACTURING PROCESS USING WIRE AND DYNAMIC CORRECTING METHOD USING THE SAME

(71) Applicant: INDUSTRIAL TECHNOLOGY RESEARCH INSTITUTE, Hsinchu (TW)

(72) Inventors: Shang-Kun Li, Taichung (TW); Chih-Hsuan Shih, Xihu Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 281 days.

(21) Appl. No.: 16/985,845

(22) Filed: Aug. 5, 2020

(65) Prior Publication Data
US 2021/0187816 A1    Jun. 24, 2021

Related U.S. Application Data

(60) Provisional application No. 62/951,001, filed on Dec. 20, 2019.

(30) Foreign Application Priority Data

May 11, 2020    (TW) .................................. 109115578

(51) Int. Cl.
*B29C 53/80* (2006.01)
*B29C 53/56* (2006.01)

(52) U.S. Cl.
CPC ........ *B29C 53/8041* (2013.01); *B29C 53/564* (2013.01)

(58) Field of Classification Search
CPC . B29C 53/8041; B29C 53/564; B29C 53/605; B29C 53/665
See application file for complete search history.

(56) References Cited

U.S. PATENT DOCUMENTS 4,519,290 A    5/1985  Inman et al.
7,835,567 B2   11/2010  Oldani
(Continued)

FOREIGN PATENT DOCUMENTS

CN    103901853 A    7/2014
CN    104252920 A    12/2014
(Continued)

OTHER PUBLICATIONS

U.S. Office Action for U.S. Appl. No. 17/316,995, dated Sep. 8, 2022.
(Continued)

*Primary Examiner* — S. Behrooz Ghorishi
(74) *Attorney, Agent, or Firm* — Birch, Stewart, Kolasch & Birch, LLP

(57) ABSTRACT

A dynamic correction system of a manufacturing process using wire is provided. The dynamic correction system includes a driving device, a path sensor, and a controller. The driving device is configured to: drive a carrier with a motion parameter and encapsulate the carrier with a wire. The path sensor is configured to obtain an actual path information of the wire encapsulating the carrier. The controller is configured to: obtain an actual path of the wire encapsulating the carrier according to the actual path information; obtain an actual path difference between a target path and the actual path; determine whether the actual path difference is greater than a predetermined error; and, when the actual path difference is greater than the predetermined error, control the driving device to change the motion parameter to cause the (Continued)

actual path of the wire encapsulating the carrier to approach the target path.

8 Claims, 6 Drawing Sheets

(56) References Cited

U.S. PATENT DOCUMENTS

| | | | |
|---|---|---|---|
| 9,403,325 | B2 | 8/2016 | Corradini et al. |
| 9,499,926 | B2 | 11/2016 | Cohen |
| 9,726,616 | B2 | 8/2017 | Mathon et al. |
| 9,909,238 | B2 | 3/2018 | Wolf et al. |
| 10,328,641 | B1 * | 6/2019 | Johnson ............... B29C 70/528 |
| 2015/0239181 | A1 * | 8/2015 | Corradini ............... B29C 70/56 |
| | | | 156/64 |
| 2015/0287490 | A1 * | 10/2015 | Spiegelhalder ....... B29C 64/112 |
| | | | 156/441 |
| 2016/0243762 | A1 | 8/2016 | Fleming et al. |
| 2018/0108826 | A1 | 4/2018 | Tajitsu et al. |
| 2018/0178309 | A1 | 6/2018 | Inoue et al. |
| 2018/0326590 | A1 | 11/2018 | Masuda et al. |
| 2019/9954639 | | 2/2019 | Fujii et al. |
| 2021/0187816 | A1 | 6/2021 | Li et al. |
| 2022/0064831 | A1 | 3/2022 | Budillon et al. |

FOREIGN PATENT DOCUMENTS

| | | |
|---|---|---|
| CN | 104532452 A | 4/2015 |
| CN | 204855298 U | 12/2015 |
| CN | 105518195 A | 4/2016 |
| CN | 109623780 A | 4/2019 |
| JP | 6460923 B2 | 1/2019 |
| TW | 200530448 A | 9/2005 |
| TW | I531438 B | 5/2016 |
| TW | 201632687 A | 9/2016 |
| TW | I612914 B | 2/2018 |
| TW | 201820106 A | 6/2018 |
| TW | I629465 B | 7/2018 |
| TW | M564181 U | 7/2018 |
| TW | 201926024 A | 7/2019 |
| WO | WO 2019/106509 A1 | 6/2019 |

OTHER PUBLICATIONS

Hans et al., "Finite element simulation of the braiding process for arbitrary mandrel shapes", Composites: Part A, 2015, vol. 77, pp. 124-132.
Kuang, "Study on Stability in Filament Winding", Manufacturing Technologies, 2009, total 5 pages.
Pickett et al., "Comparison of analytical and finite element simulation of 2D braiding", Plastics, Rubber and Composites, 2009, vol. 38, No. 9/10, pp. 387-395.
Ravenhorst et al., "A yarn interaction model for circular braiding", Composites: Part A, 2016, vol. 81, pp. 254-263.
Sun et al., "Experimental and numerical studies on the braiding of carbon fibres over structured end-fittings for the design and manufacture of high performance hybrid shafts", Production Engineering, 2018, vol. 12, pp. 215-228.
Wu, "Design and Study for Filament Wound Composite Pressure Vessels", Jun. 2002, total 86 pages.
"Composite Braiding Process and Its Applications," May 2020, pp. 60-68, with English abstract.
Taiwanese Office Action and Search Report for Taiwanese Application No. 109142364, dated Mar. 28, 2022.

* cited by examiner

US 11,685,104 B2

DYNAMIC CORRECTING SYSTEM OF MANUFACTURING PROCESS USING WIRE AND DYNAMIC CORRECTING METHOD USING THE SAME

This application claims the benefit of U.S. provisional application Ser. No. 62/951,001, filed Dec. 20, 2019, the subject matter of which is incorporated herein by reference, and claims the benefit of Taiwan application Serial No. 109115578, filed May 11, 2020, the subject matter of which is incorporated herein by reference.

BACKGROUND OF THE INVENTION

Field of the Invention

The invention relates in general to a correction system and a correction method using the same, and more particularly to a dynamic correction system of a manufacturing process using wire and a dynamic correction method using the same.

Description of the Related Art

According to the existing wire encapsulating process, a carrier is covered with a wire by a machine, and the manufacturing process of the like includes winding or braiding. The wire encapsulating quality of the carrier is subjected to many factors, such as the motion parameter of the machine and the appearance of the carrier. The wire encapsulating quality is not necessarily eligible for each product. During the wire encapsulating process, the wire may be slipped, split, or twisted and result in defects. When a product is found to have wire encapsulating defects, the current practice is to classify the product as a defective or a rejected product. Therefore, it has become a prominent task for the industries to provide a technology for resolving the problem of wire encapsulating defects.

SUMMARY OF THE INVENTION

The invention is directed to a dynamic correction system of a manufacturing process using wire and a dynamic correction method using the same.

According to one embodiment of the present invention, a dynamic correction system of a manufacturing process using wire is provided. The dynamic correction system includes a driving device, a path sensor, and a controller. The driving device is configured to: drive a carrier with a motion parameter and encapsulate the carrier with a wire. The path sensor is configured to obtain an actual path information of the wire encapsulating the carrier. The controller is configured to: obtain an actual path of the wire encapsulating the carrier according to the actual path information; obtain an actual path difference between a target path and the actual path; determine whether the actual path difference is greater than a predetermined error; and, when the actual path difference is greater than the predetermined error, control the driving device to change the motion parameter to cause the actual path of the wire encapsulating the carrier to approach the target path.

According to another embodiment of the present invention, a dynamic correction method of a manufacturing process using wire is provided. The dynamic correction method includes the following steps: driving a carrier with a motion parameter by a driving device; encapsulating the carrier with a wire by the driving device; obtaining an actual path information of the wire encapsulating the carrier by a path sensor; obtaining an actual path of the wire encapsulating the carrier by a controller according to the actual path information; obtaining an actual path difference between a target path and the actual path by the controller; determining whether the actual path difference is greater than a real-time error by the controller; and when the actual path difference is greater than the real-time error, changing the motion parameter by the controller to cause the actual path of the wire encapsulating the carrier to approach the target path.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
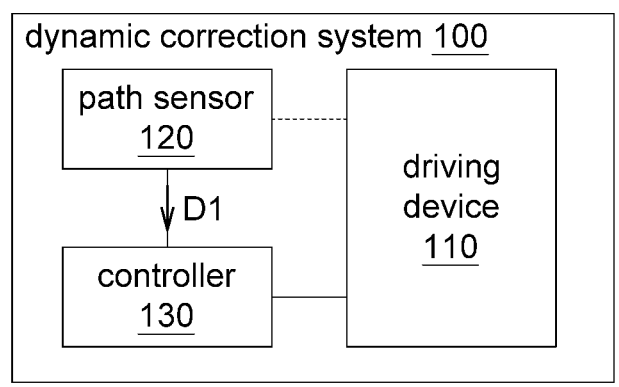
FIG. 1A is a functional block diagram of a dynamic correction system of a manufacturing process using wire according to an embodiment of the present disclosure.
Figure 1B:
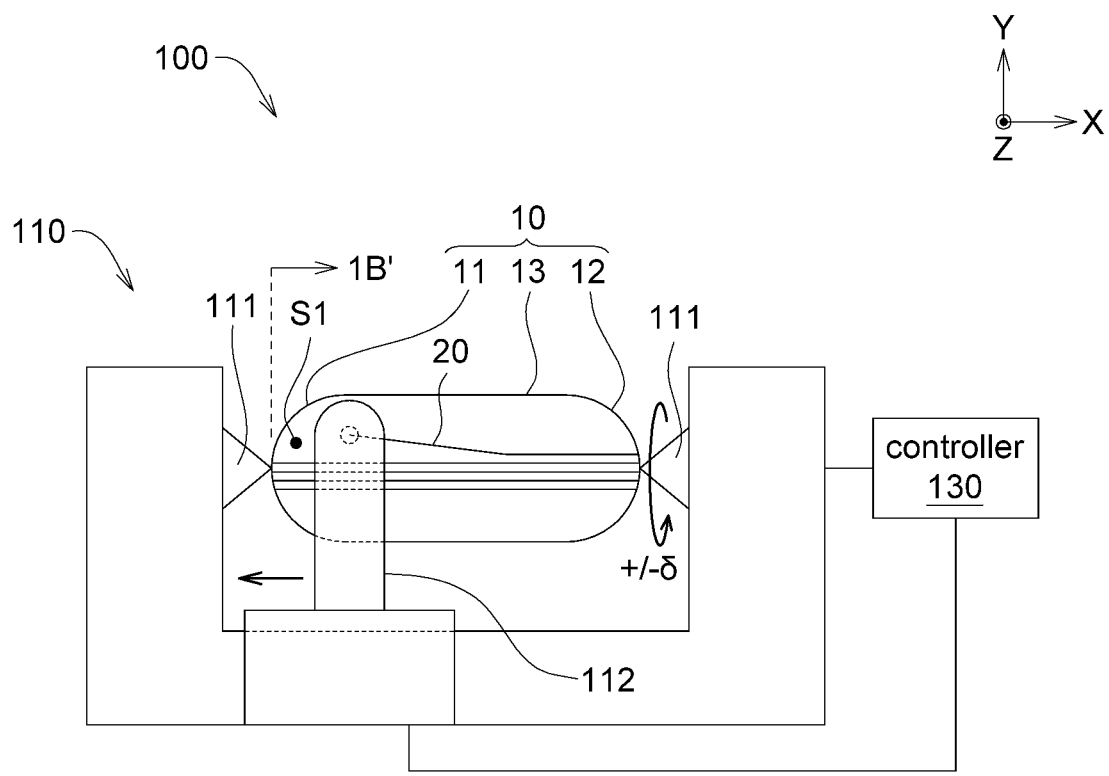
FIG. 1B is a schematic diagram of the dynamic correction system of a manufacturing process using wire of FIG. 1A.
Figure 1C:
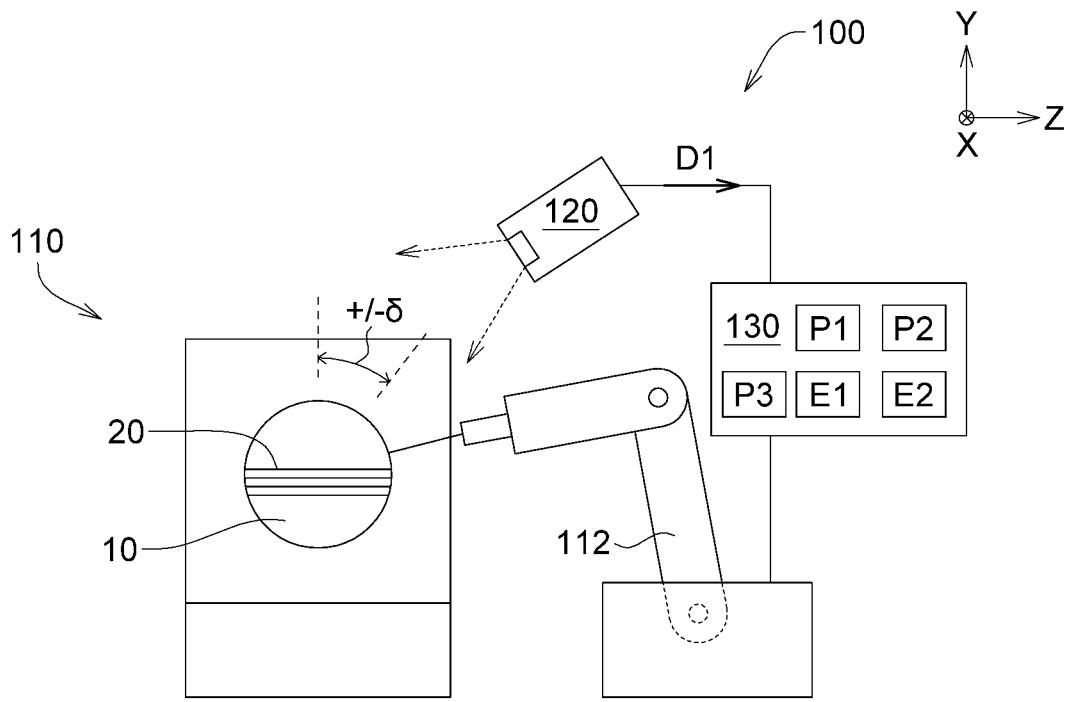
FIG. 1C is a schematic diagram of the dynamic correction system of FIG. 1B viewed towards a direction 1B'.

Refer to FIGS. 1A to 1C. FIG. 1A is a functional block diagram of a dynamic correction system 100 of a manufacturing process using wire according to an embodiment of the present disclosure. FIG. 1B is a schematic diagram 100 of the dynamic correction system 100 of a manufacturing process using wire of FIG. 1A. FIG. 1C is a schematic diagram of the dynamic correction system of FIG. 1B viewed towards a direction 1B'.

The dynamic correction system 100 includes a driving device 110, a path sensor 120 and a controller 130. The controller 130 can be realized by a circuit structure, such as chip, semi-conductor package or other circuit element, wherein the circuit structure is covered using a semi-conductor process.

The driving device 110 is configured to drive the carrier 10 with a motion parameter and encapsulate the carrier 10 with a wire 20. In the present specification "wire encapsulating process" refers to winding process, braiding process, and so on. The dynamic correction system 100 of FIGS. 1A to 1C is exemplified by a winding system, but the present disclosure is not limited thereto.

The path sensor 120 is configured to obtain an actual path information D1 of the wire 20 encapsulating the carrier 10. The controller 130 is configured to: (1) obtain an actual path P1 of the wire 20 encapsulating the carrier 10 according to the actual path information D1, (2) obtain an actual path difference ΔP1 between a target path P2 and the actual path P1; (3) determine whether the actual path difference ΔP1 is greater than a real-time error E1 and, (4) when the actual path difference ΔP1 is greater than the real-time error E1, control the driving device 110 to change the motion parameter to cause the actual path P1 of the wire 20 encapsulating the carrier 10 to approach the target path P2. To summarize, the dynamic correction system 100 of the present disclosure corrects the wire 20 whose path is not on the target path P2 (referred as "wire encapsulating defects" in the present specification) during the process of encapsulating the carrier 10 with the wire 20, and causes the wire 20 having wire encapsulating defects to approach the target path P2 as much as possible.

The target path P2 can be a simulated path generated using software. The path pattern of the target path P2 is determined according to actual use of the product, and is not limited in the present disclosure. The target path P2 can be pre-stored in the controller 130 or a memory (not illustrated), and the controller 130 can access the memory to store, obtain, correct and/or set the target path P2. Besides, the real-time error E1 is in a range of 0.1% to 10% of the actual path difference ΔP1. The real-time error E1 can be pre-stored in the controller 130, or a memory (not illustrated), and the controller 130 can access the memory to store, obtain, correct, and/or set the real-time error E1.

In the embodiment, the shape of the carrier 10 can be a bottle, a rod, a sphere, or a cone which can be covered with a wire. In the present embodiment, the carrier 10 includes a first end 11, a second end 12, and a carrying portion 13, wherein the carrying portion 13 is interposed between the first end 11 and the second end 12 and connects the first end 11 and the second end 12. The outer surface of the first end 11 and/or the second end 12 can be formed of a curved surface, a plane, or a combination thereof, wherein the curved surface can be a spherical surface or other geometric pattern. The outer surface of the carrying portion 13 can be formed of a curved surface (such as a cylindrical surface), a plane or a combination thereof. The present disclosure does not limit the geometric pattern of the carrier 10, and any geometric pattern would do as long as it meets the needs of the product.

In terms of product category, example of the carrier 10 includes but is not limited to a component of a transportation device (such as an aircraft frame, a vehicle frame, or a bicycle frame), a sports equipment (such as a badminton racket, a hockey handle, or a paddle), or an item of livelihood supplies (such as an LPG cylinder, a hydrogen cylinder, an oxygen cylinder, a high-pressure barrier or a high-pressure pipe) that requires high strength performance. The wire 20 can be formed of a composite material, such as carbon fiber or glass fiber possessing the features of light-weight and high strength. After the wire encapsulating process is completed, the carrier 10 covered with the wire 20 is then baked at a high temperature. The wire 20 is formed of a wire body (supporting material) and resin (base material). After encapsulating the carrier 10, the wire 20 is baked at a high temperature for the resin to be melted and combined with the wire body to form a composite material possessing the feature of high stress resistance.

In the present embodiment as indicated in FIGS. 1B and 1C, the driving device 110 includes a rotation shaft 111 and a robotic arm 112. For the technical features of the present disclosure to be more clearly illustrated, the path sensor 120 is not illustrated in FIG. 1B. The rotation shaft 111 drives the carrier 10 to rotate at a rotation angle δ. The robotic arm 112 covers the carrier 10 with the wire 20. Moreover, the robotic arm 112 can have 6 degrees of freedom, including translating along the X axis, Y axis, and Z axis and rotating around the X axis, Y axis, and Z axis. The robotic arm 112 can translate along the −X axis to encapsulate (or press) the outer surface of the carrier 10 with the wire 20. When the robotic arm 112 is translated to the first end 11 of the carrier 10, the rotation shaft 111 can drive the carrier 10 at a rotation angle δ (such as around +X axis) and rotate the other surface of the carrier 10 (the surface of the carrier 10 facing the paper) to face the robotic arm 112, such that the wire 20 provided by the robotic arm 112 can encapsulate the other surface of the carrier 10. Then, the robotic arm 112 is translated to the second end 12 of the carrier 10 along the +X axis to encapsulate the outer surface of the carrier 10 with the wire 20 during the translation process. Through the reciprocal translation along the +/−X axis and the reciprocal rotation around the +/−X axis, the robotic arm 112 continuously covers the carrier 10 with more wire 20 until the wire encapsulating operation is completed.

In the present embodiment, the said motion parameter is such as the rotation angle δ of the rotation shaft 111. The controller 130 is further configured to: when the actual path difference ΔP1 is greater than the real-time error E1, control the rotation shaft 111 to change the rotation angle δ to cause the actual path P1 of the wire 20 encapsulating the carrier 10 to approach the target path P2. According to one of the methods for controlling the rotation angle δ of the rotation shaft 111, the controller 130 can control the rotation shaft 111 to change the rotation angle δ through reciprocal motion. For example, the controller 130 controls the rotation shaft 111 to reciprocally rotate around the +/−X axis to change the rotation angle δ to cause the actual path P1 of the wire 20 encapsulating the carrier 10 to gradually stabilize and approach the target path P2. The present disclosure does not limit the number of times for which the rotation shaft 111 reciprocally rotates around the +/−X axis, and the number of times of reciprocal rotation can be one or more. In another embodiment, the controller 130 can control the rotation shaft 111 to reduce the velocity of rotation and rotate in the same direction or in an inverse direction to cause the actual path P1 of the wire 20 encapsulating the carrier 10 to gradually stabilize and approach the target path P2. Furthermore, during the process of correcting wire encapsulating defects, the controller 130 can halt the robotic arm 112 and do not resume the original (predetermined) control mode (rotation angle/velocity) of the robotic arm 112 until the actual path P1 of the wire 20 encapsulating the carrier 10 approaches the target path P2.

In another embodiment, the controller 130 predicts a path of the wire 20 encapsulating the carrier 10, and determines whether to change the motion parameter of the driving device 110 according to the predicted path.

For example, the controller 130 is further configured to: (1) predict the predicted path P3 of the wire 20 encapsulating the carrier 10 according to the actual path P1; (2) obtain a predicted path difference ΔP2 between the predicted path P3 and the target path P2; (3) determine whether the predicted path difference ΔP2 is greater than the prediction error E2; (4) when the actual path difference ΔP1 is greater than the real-time error E1 and the predicted path difference ΔP2 is greater than the prediction error E2, control the driving device 110 to change the motion parameter to cause the actual path P1 of the wire 20 encapsulating the carrier 10 to approach the target path P2.

To summarize, even when the predicted path difference ΔP2 is greater than the prediction error E2, if the actual path difference ΔP1 is smaller than the real-time error E1, the controller 130 will not change the motion parameter of the driving device 110. Thus, with the analysis of predicted path, the number of times for which (or the frequency at which) the driving device 110 changes the motion parameter can be reduced without affecting the correction of wire encapsulating defects.

In an embodiment, the prediction error E2 is greater than the real-time error E1, that is, the prediction error E2 is looser than the real-time error E1. The ratio of the real-time error E1 to the prediction error E2 is in a range of 0.9 to 0.1, such as 0.5. Also, the prediction error E2 is in a range of 0.1% to 10% of the predicted path difference ΔP2. The prediction error E2 can be pre-stored in the controller 130 or a memory (not illustrated), and the controller 130 can access the memory to store, obtain, correct, and/or set the prediction error E2.

Additionally, the timing for correcting wire encapsulating defects according to the present disclosure is: when the wire 20 is located besides the robotic arm 112. For example, the controller 130 controls the driving device 110 to change the motion parameter before the wire 20 covers the terminal portion S1 of the carrier 10 (the terminal portion S1 is illustrated in FIG. 1B), such that wire correction can be completed before the other side of the carrier 10 rotates to face the robotic arm 112. The terminal portion S1 can be any part of the outer surface of the first end 11, any part of the outer surface of the second end 12, or the endmost point of the first end 11 or the second end 12 (closest to the rotation shaft 111).

In an embodiment, the controller 130 can analyze the actual path P1 of the wire 20 according to the wire 20, and the details of analysis are disclosed below.

Figure 2A:
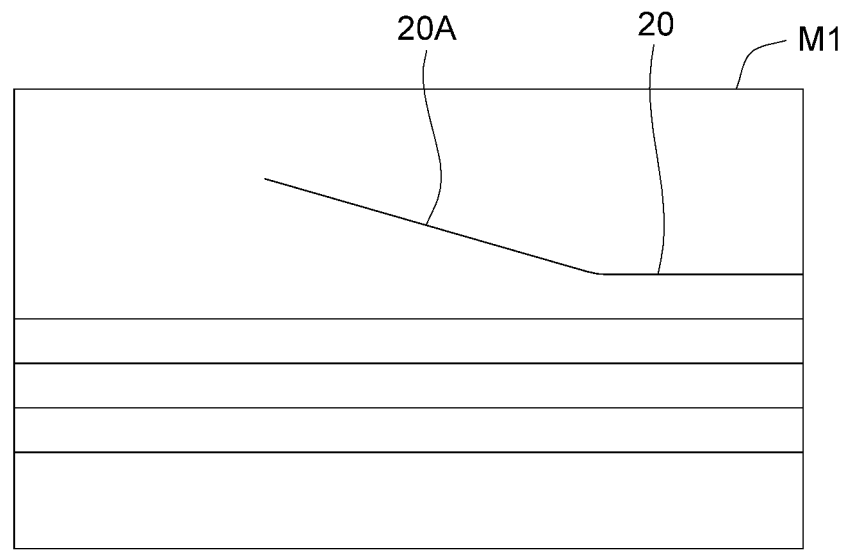
FIG. 2A is a schematic diagram of a path image of wire captured by the path sensor of FIG. 1B.
Figure 2B:
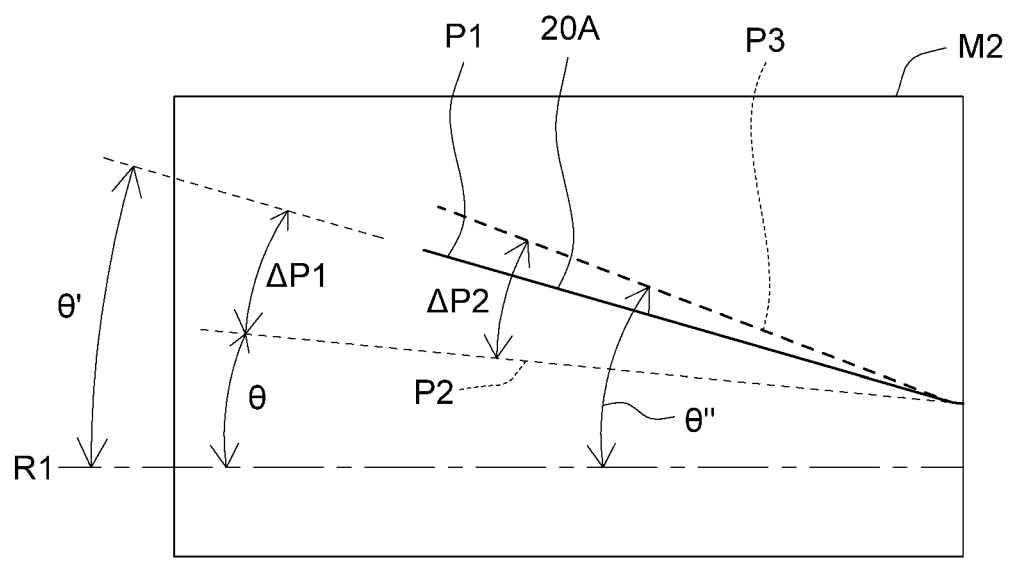
FIG. 2B a schematic diagram of a to-be-detected area image of the to-be-detected area in the path image of FIG. 2A.

Refer to FIGS. 2A and 2B. FIG. 2A is a schematic diagram of a path image M1 of wire 20 captured by the path sensor 120 of FIG. 1B. FIG. 2B is a schematic diagram of a to-be-detected area image M2 of the to-be-detected area 20A in the path image M1 of FIG. 2A. In the present embodiment, the path sensor 120, such as a video recorder, is configured to capture a path image of the wire 20 encapsulating the carrier 10. As indicated in FIG. 1A, the path sensor 120 and the driving device 110 can transmit data in a wireless manner without physical contact. However, depending on the types of the path sensor 120, the path sensor 120 and the driving device 110 can contact each other and transmit data in a wired manner. The actual path information D1 is such as a path image captured by the path sensor 120. The dynamic correction system 100 can have one or more path sensors 120 disposed beside the robotic arm 112 to capture a path image of the wire 20 which is located beside the robotic arm 112 and covers the carrier 10. However, in another embodiment, at least one path sensor 120 can be disposed opposite to the robotic arm 112 to capture the path image of the wire 20 encapsulating the other side of the carrier 10 (the side of the carrier 10 opposite to the robotic arm 112). The present disclosure does not limit the quantity and/or location of the path sensor 120 as long as the detects can be real-time monitored and/or corrected.

Besides, the present disclosure does not limit the type of the path sensor 120. The path sensor 120 can be a 3D scanner, a line laser scanner, a 2D camera, or an ultrasonic ranging device.

The controller 130 is further configured to: analyze a path image M1 to obtain the actual path P1. For example, the controller 130 firstly captures a to-be-detected area image M2 of the to-be-detected area 20A in the path image M1 using image processing technique. Then, the controller 130 obtains an actual angle θ' of the to-be-detected area image M2 of the to-be-detected area 20A with respect to a reference axis R1. The reference axis R1 is an axis of the rotation shaft 111, such as the X axis of FIG. 1A. For the drawings to be more easily understood, the target path P2 is represented by dotted lines in FIG. 2B. The controller 130 uses the difference between the actual angle θ' and the target angle θ corresponding to the target path P2 as the actual path difference ΔP1. When the difference between the actual angle θ' and the target angle θ (that is, the actual path difference ΔP1) is greater than the real-time error E1, the controller 130 determines that the wire 20 has deviated from the target path P2, and controls the driving device 110 to change the motion parameter to correct the wire encapsulating defects. Moreover, the said image processing technology includes Hough transformation and/or region of interest (ROI) technique.

Furthermore, the controller 130 can control the driving device 110 using a proportional-integral-derivative (PID) approach. For example, as indicated in formula (1), Kp represents a proportional gain (or proportional controller); Ki represents an integral gain (or integral controller); Kd represents a derivative gain (or derivative controller); e(t) represents an error function, such as the difference between the feedback value (such as the actual angle θ') and the set value (such as the target angle θ); u(t) represents a control output. In an embodiment, the proportional gain Kp, the integral gain Ki and the derivative gain Kd can be calculated or can be obtained using a simulation software.

$$u(t) = K_P e(t) + K_i \int_0^t e(\tau)d\tau + K_d \frac{d}{dt}e(t) \tag{1}$$

A set of proportional gain Kp, integral gain Ki and derivative gain Kd enable the u(t) function for correcting wire encapsulating defects to gradually or quickly enter a stable (or convergent) period from the oscillation period as the time domain moves forwards. Under the PID feedback control mechanism, the controller 130 controls the rotation shaft 111 to reciprocally rotate around the +/−X axis to change the rotation angle δ (corresponding to the oscillation curve in the time domain of the u(t) function) to cause the actual path P1 of the wire 20 encapsulating the carrier 10 to gradually approach the target path P2 (corresponding to the stable period or the convergent period in the time domain of the u(t) function).

In an embodiment, during the wire encapsulating process, the path sensor 120 can capture (photo) the path image M1 of the wire 20 encapsulating the carrier 10 continuously or every period of time (such as 1 second, or longer or shorter than 1 second). The controller 130 can analyze the path image M1 captured by the path sensor 120 to continuously monitor the latest state of the wire 20 encapsulating the carrier 10.

Figure 3:
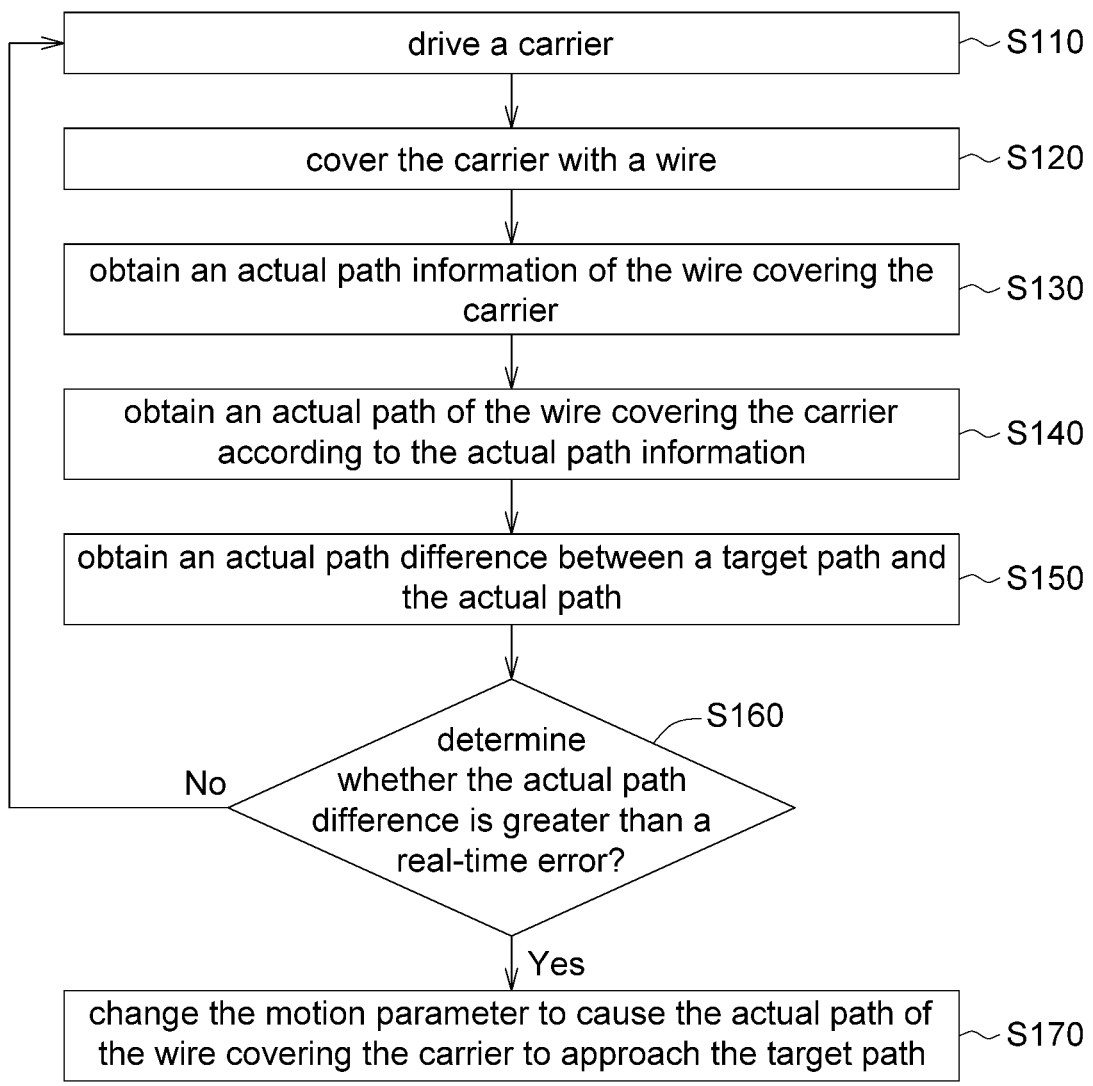
FIG. 3 is a flowchart of a dynamic correction method of the dynamic correction system of FIG. 1B.

Referring to FIG. 3, a flowchart of a dynamic correction method of the dynamic correction system 100 of FIG. 1B is shown.

In step S110, the carrier 10 is driven by the driving device 110 with a motion parameter. For example, the carrier 10 is driven by the rotation shaft 111 of the driving device 110 with a motion parameter, such as a rotation angle δ of the rotation shaft 111.

In step S120, the carrier 10 is covered with the wire 20 by the driving device 110. For example, the carrier 10 is covered with the wire 20 by the robotic arm 112 of the driving device 110.

In step S130, an actual path information D1 of the wire 20 encapsulating the carrier 10 is obtained by the path sensor 120. In an embodiment, the path sensor 120 is such as a video recorder, and the actual path information D1 is such as a path image M1 of the wire 20 encapsulating the carrier 10 captured by the path sensor 120.

In step S140, an actual path P1 of the wire 20 encapsulating the carrier 10 is obtained by the controller 130 according to the actual path information D1.

In step S150, an actual path difference ΔP1 between the target path P2 and the actual path P1 is obtained by the controller 130.

In step S160, whether the actual path difference ΔP1 is greater than the real-time error E1 is determined by the controller 130. When the actual path difference ΔP1 is greater than the real-time error E1, the method proceeds to step S170, when the actual path difference ΔP1 is not greater than or is equivalent to the real-time error E1, the method proceeds to step S110.

In step S170, the motion parameter of the driving device 110 is changed by the controller 130 to cause the actual path P1 of the wire 20 encapsulating the carrier 10 to approach the target path P2.

Additionally, during the process of continuously encapsulating the carrier 10 with the wire 20, the controller 130 can repeat steps S130 to S170 to continuously monitor the state of the wire 20 encapsulating the carrier 10, and when the wire 20 has encapsulating defects, the controller 130 can immediately correct the path of the wire 20 to cause the actual path P1 of the wire 20 encapsulating the carrier 10 to approach or even return to the target path P2.

Figure 4:
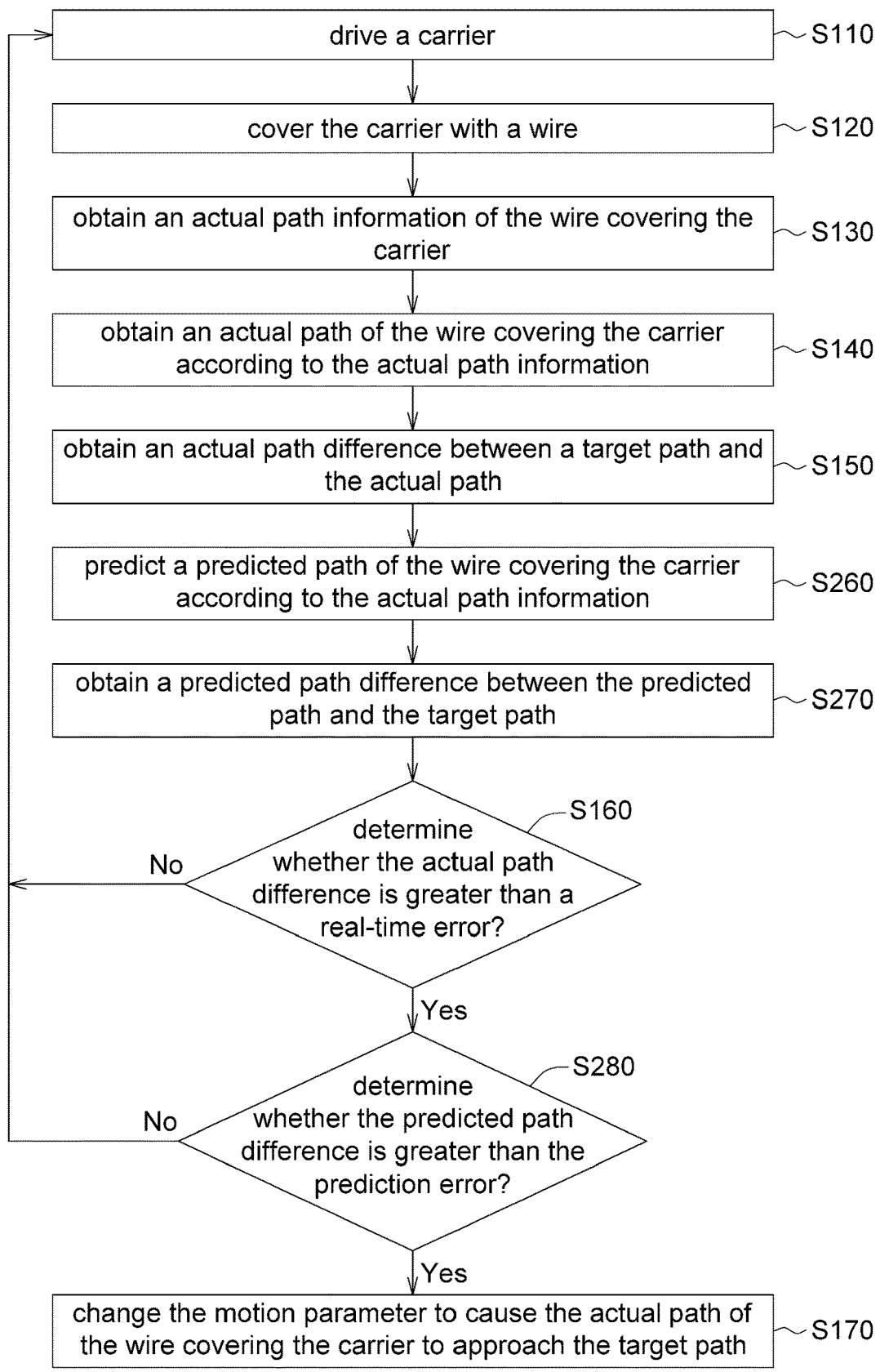
FIG. 4 is another flowchart of a dynamic correction method of the dynamic correction system of FIG. 1B

Referring to FIG. 4, another flowchart of a dynamic correction method of the dynamic correction system 100 of FIG. 1B is shown. Details of steps S110 to S150 of FIG. 4 are already disclosed, and are not repeated here. The following descriptions of the dynamic correction method start with step S260.

In step S260, a predicted path P3 of the wire 20 encapsulating the carrier 10 is predicted by the controller 130 according to the actual path information D1.

In step S270, a predicted path difference ΔP2 between the predicted path P3 and the target path P2 is obtained by the controller 13.

In step S160, determine whether the actual path difference ΔP1 is greater than the real-time error E1 is determined by the controller 130. When the actual path difference ΔP1 is greater than the real-time error E1, the method proceeds to step S280; when the actual path difference ΔP1 is not greater than or is equivalent to the real-time error E1, the method returns to step S110.

In step S280, whether the predicted path difference ΔP2 is greater than the prediction error E2 is determined by the controller 130. The controller 130 uses the difference between the prediction angle θ" (the prediction angle θ" is illustrated in FIG. 2B) and the target angle θ corresponding to the target path P2 as the predicted path difference ΔP2. As indicated in FIG. 2B, the prediction angle θ" is the angle between the predicted path P3 and the reference axis R1. The predicted path P3 of FIG. 2B is for illustrative purpose only, and may not be illustrated in the actual to-be-detected area image M2. When the predicted path difference ΔP2 is greater than the prediction error E2, the method proceeds to step S170; when the predicted path difference ΔP2 is not greater than or is equivalent to the prediction error E2, the method returns to step S110.

To summarize, the controller 130 changes the motion parameter of the driving device 110 only when the actual path difference ΔP1 is greater than the real-time error E1 and the predicted path difference ΔP2 is greater than the prediction error E2. In other words, even when the predicted path difference ΔP2 is greater than the prediction error E2, if the actual path difference ΔP1 is smaller than the real-time error E1, the controller 130 will not change the motion parameter of the driving device 110. Thus, with the analysis of predicted path, the number of times for which (or the frequency at which) the driving device 110 changes the motion parameter can be reduced without affecting the correction of wire encapsulating defects.

Also, during the process of continuously encapsulating the carrier 10 with the wire 20, the controller 130 can repeat steps S130 to S150, S260, S270, S160, S280 and S170 to continuously monitor the state of encapsulating the carrier 10 with the wire 20, and when the wire 20 has encapsulating defects, the path of the wire 20 can be immediately corrected to cause the actual path P1 of the wire 20 encapsulating the carrier 10 to approach or even return to the target path P2.

In the above embodiments, the dynamic correction method is used in a winding system for an exemplary purpose. However, the dynamic correction method can also be used in a braiding system. Refer to the descriptions of FIG. 5.

Figure 5:
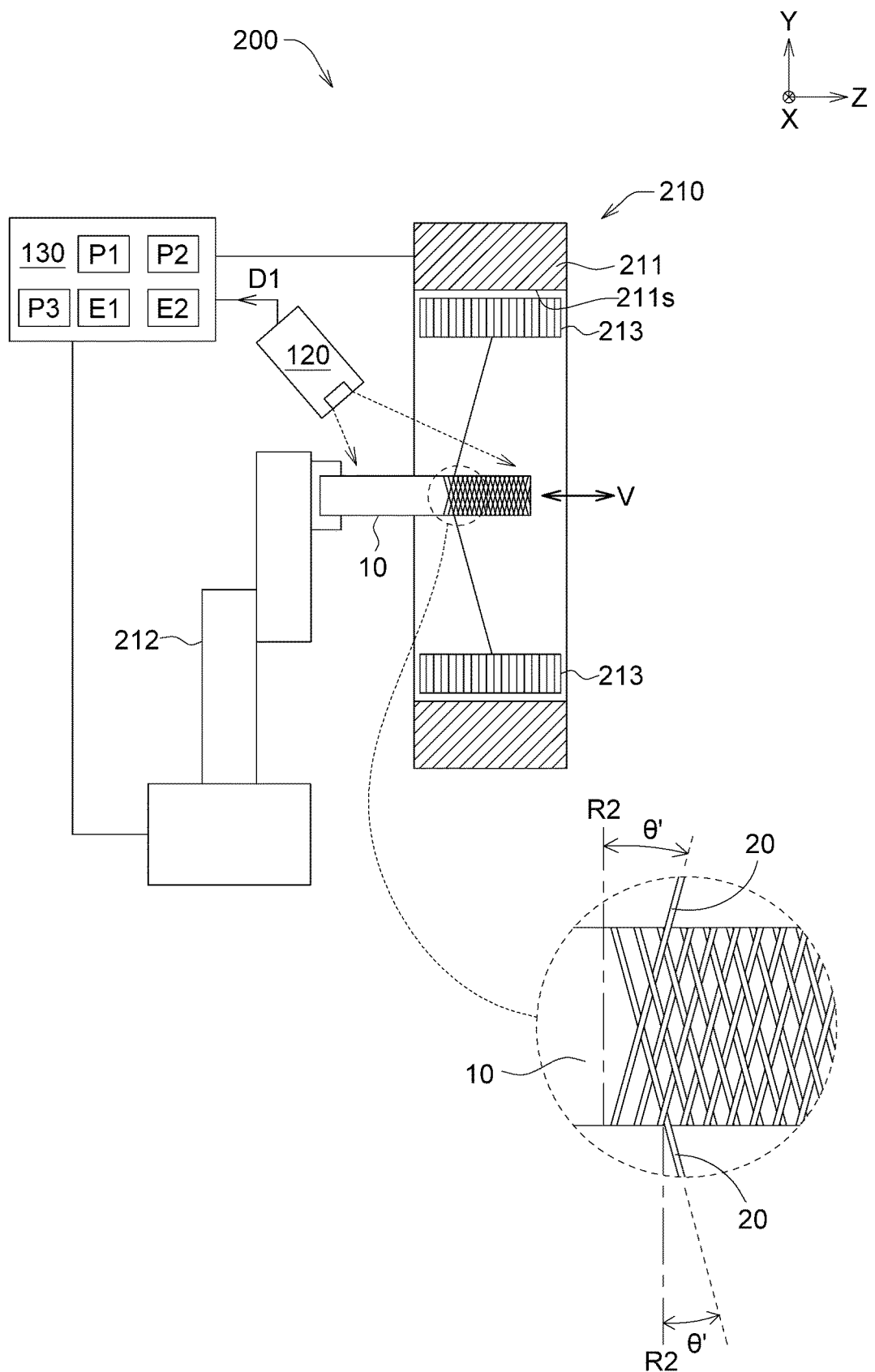
FIG. 5 is a partial diagram of a dynamic correction system of a manufacturing process using wire according to another embodiment of the present disclosure.

Refer to FIG. 5, a partial diagram of a dynamic correction system 200 of a manufacturing process using wire according to another embodiment of the present disclosure is shown. The dynamic correction system 200 is exemplified by a braiding system.

The dynamic correction system 200 includes a driving device 210, a path sensor 120, and a controller 130. The features of the dynamic correction system 200 of the present embodiment are similar to that of the dynamic correction system 100 except that the structure of the driving device 210 of the dynamic correction system 200 is different from that of the driving device 110.

In the present embodiment, the driving device 210 includes a braiding ring 211, a robotic arm 212, and at least one wire provider 213. The robotic arm 212 is configured to drive the carrier 10 with a motion parameter. The braiding ring 211 is configured to encapsulate the carrier 10 with the wire 20. At least one wire provider 213 surrounds the inner peripheral surface 211s of the braiding ring 211 to provide the wire 20 to the carrier 10. When the braiding ring 211 rotates around the Z axis (the + or −Z axis), the braiding ring 211 drives the wire provider 213 to rotate around the Z axis and cause the wire 20 on the wire provider 213 to be braided on the outer surface of the carrier 10. Moreover, the robotic arm 212 can have 6 degrees of freedom, including translating along the X axis, Y axis, and Z axis and rotating around the X axis, Y axis, and Z-ax.

Like the said driving device 110, the driving device 210 of the present embodiment is configured to drive the carrier 10 with a motion parameter and to encapsulate the carrier 10 with the wire 20. The path sensor 120 is configured to obtain an actual path information D1 of the wire 20 encapsulating the carrier 10. The controller 130 is configured to: (1) obtain the actual path P1 of the wire 20 encapsulating the carrier 10 according to the actual path information D1, (2) obtain an actual path difference ΔP1 between the target path P2 and the actual path P1; (3) determine whether the actual path difference ΔP1 is greater than the real-time error E1 and, (4) when the actual path difference ΔP1 is greater than the real-time error E1, control the driving device 210 to change the motion parameter to cause the actual path P1 of the wire 20 encapsulating the carrier 10 to approach the target path P2. To summarize, the dynamic correction system 200 of the present disclosure can correct the wire 20 whose path is not on the target path P2 (the wire encapsulating defects) during the wire encapsulating process and cause the wire 20 having wire encapsulating defects to return to the predetermined target path P2 as much as possible.

In the present embodiment, the said motion parameter can be a feeding velocity V of the robotic arm 212, such as the translating velocity along the +/−Z axis. The controller 130 is further configured to: when the actual path difference ΔP1 is greater than the real-time error E1, control the robotic arm 212 to change the feeding velocity V to cause the actual path P1 of the wire 20 encapsulating the carrier 10 to approach the target path P2. According to one of the methods for controlling the feeding velocity V of the robotic arm 212, the controller 130 can control the robotic arm 212 to change the feeding direction through reciprocal motion. For example, the controller 130 controls the robotic arm 212 to change the feeding direction along the +/−the Z axis reciprocally to cause the actual path P1 of the wire 20 encapsulating the carrier 10 to gradually stabilize and approach the target path P2. The present disclosure does not limit the number of times for which the robotic arm 212 reciprocally rotates around the +/−Z axis, and the number of times of reciprocal rotation can be one or more. In another embodiment, the controller 130 can control the robotic arm 212 to reduce the feeding velocity and rotate in the same direction or in an inverse direction to cause the actual path P1 of the wire 20 encapsulating the carrier 10 to gradually stabilize and approach the target path P2. Furthermore, during the process of correcting wire encapsulating defects, the controller 130 can halt the braiding ring 211. Furthermore, during the process of correcting wire encapsulating defects, the controller 130 can halt the robotic arm 112 and do not resume the original (predetermined) control mode (rotation velocity) of the braiding ring 211 until the actual path P1 of the wire 20 encapsulating the carrier 10 approaches the target path P2.

Like the analysis performed by the dynamic correction system 100, in the present embodiment, the controller 130 can analyze the actual path P1 of the wire 20 according to the angle of the wire 20. As indicated in FIG. 5, the wire 20 has an actual angle θ' with respect to a reference axis R2, which can be the +/−Y axis, or any geometric reference on the carrier 10. The controller 130 can analyze a path image M1 (not illustrated) captured by the path sensor 120 to obtain the actual angle θ'. Then, the controller 130 uses the difference between the actual angle θ' and the target angle θ (not illustrated) corresponding to the target path P2 as the actual path difference ΔP1. When the difference between the actual angle θ' and the target path P2 is greater than the real-time error E1, the controller 130 determines that the wire 20 has deviated from the target path P2, and or immediately controls the driving device 210 to change its motion parameter to correct the wire encapsulating defects.

Moreover, the dynamic correction system 200 can correct the wire encapsulating path using the method disclosed in FIGS. 3 and 4 except that the motion parameter controlled by the dynamic correction system 200 is the feeding velocity V of the robotic arm 212.

While the invention has been described by way of example and in terms of the preferred embodiment (s), it is to be understood that the invention is not limited thereto. On the contrary, it is intended to encapsulate various modifications and similar arrangements and procedures, and the scope of the appended claims therefore should be accorded the broadest interpretation so as to encompass all such modifications and similar arrangements and procedures.

What is claimed is:

1. A dynamic correction method of a manufacturing process using wire, wherein the dynamic correction method comprises:
    driving a carrier with a motion parameter by a driving device;
    encapsulating the carrier with a wire by the driving device;
    obtaining an actual path information of the wire encapsulating the carrier by a path sensor;
    obtaining an actual path of the wire encapsulating the carrier by a controller according to the actual path information;
    obtaining an actual path difference between a target path and the actual path by the controller;
    determining whether the actual path difference is greater than a real-time error by the controller; and
    when the actual path difference is greater than the real-time error, changing the motion parameter by the controller to cause the actual path of the wire encapsulating the carrier to approach the target path;
    wherein the driving device comprises a rotation shaft and a robotic arm; the dynamic correction method further comprises:
        controlling the robotic arm to reciprocally translate along an axis and the rotation shaft to reciprocally rotate around the axis until a wire encapsulating operation is completed by the controller; and
        during a process of correcting a wire encapsulating defect, halting the robotic arm and not resuming an original control mode of the robotic arm until the actual path of the wire encapsulating the carrier approaches the target path by the controller.

2. The dynamic correction method according to claim 1, wherein the motion parameter is a rotation angle of the rotation shaft; and the dynamic correction method further comprises:
    when the actual path difference is greater than the real-time error, controlling the rotation shaft by the controller to change the rotation angle to cause the actual path of the wire encapsulating the carrier to approach the target path.

3. The dynamic correction method according to claim 2, further comprising:
    when the actual path difference is greater than the real-time error, controlling the rotation shaft by the controller to change the rotation angle through a reciprocal motion to cause the actual path of the wire encapsulating the carrier to approach the target path.

4. The dynamic correction method according to claim 2, further comprising:
    before the wire covers a terminal portion of the carrier, controlling the rotation shaft to change the motion parameter to cause the actual path of the wire encapsulating the carrier to approach the target path by the controller.

5. The dynamic correction method according to claim 1, wherein the driving device comprises a braiding ring, the motion parameter is a feeding velocity of the robotic arm, and the dynamic correction method further comprises:
    when the actual path difference is greater than the real-time error, controlling the robotic arm by the controller to change the feeding velocity to cause the actual path of the wire encapsulating the carrier to approach the target path.

6. The dynamic correction method according to claim 5, further comprising:

when the actual path difference is greater than the real-time error, controlling the robotic arm by the controller to change the feeding direction of the carrier through a reciprocal motion to cause the actual path of the wire encapsulating the carrier to approach the target path.

7. The dynamic correction method according to claim 1, further comprising:
predicting a predicted path of the wire encapsulating on the carrier according to the actual path information by the controller;
obtaining a predicted path difference between the predicted path and the target path by the controller;
determining whether the predicted path difference is greater than a prediction error by the controller; and
when the actual path difference is greater than the real-time error and the predicted path difference is greater than the prediction error, controlling the driving device by the controller to change the motion parameter to cause the actual path of the wire encapsulating the carrier to approach the target path;
wherein, the prediction error is greater than the real-time error.

8. The dynamic correction method according to claim 1, wherein the path sensor is a video recorder, the actual path information is a path image of the wire encapsulating the carrier, and the dynamic correction method is further configured to:
analyze the path image to obtain the actual path by the controller.

* * * * *